INVENTOR
René A. Baudry
BY
ATTORNEY

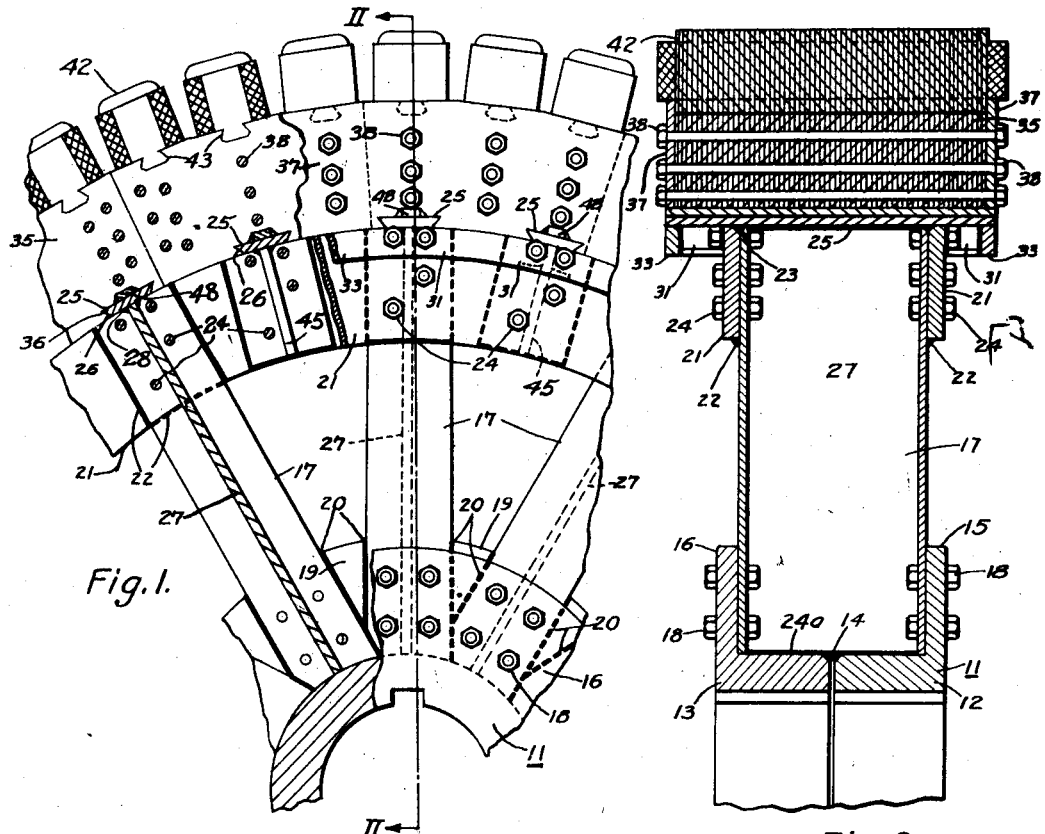
Fig. 1.
Fig. 2.
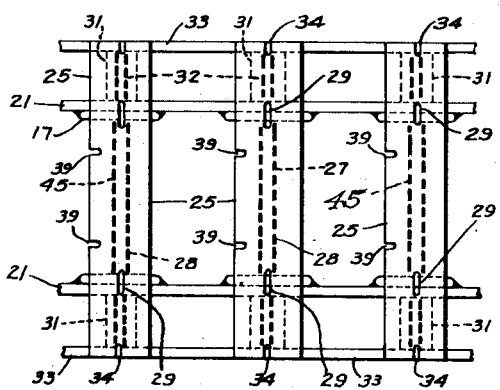
Fig. 3.
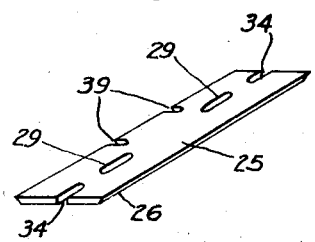
Fig. 4.
INVENTOR
René A. Baudry
BY
ATTORNEY Aug. 4, 1931.   R. A. BAUDRY   1,817,054
LARGE HIGH SPEED ROTOR
Filed Jan. 10, 1929   2 Sheets-Sheet 2

Patented Aug. 4, 1931

1,817,054

UNITED STATES PATENT OFFICE

RENÉ A. BAUDRY, OF WILKINSBURG, PENNSYLVANIA, ASSIGNOR TO WESTINGHOUSE ELECTRIC & MANUFACTURING COMPANY, A CORPORATION OF PENNSYLVANIA

LARGE, HIGH SPEED ROTOR

Application filed January 10, 1929. Serial No. 331,582.

My invention relates to rotors for dynamo-electric machines, and more particularly to large, high-speed rotors of fabricated construction.

In the manufacture of rotors for dynamo-electric machines, there is a constant demand for constructions which will give better performance, while, at the same time, there is a desire, on the part of the manufacturer, to construct such rotors with a minimum amount of material.

Prior to the present time, a limitation as to size of dynamo-electric-machine rotors had apparently been reached which necessitated an investigation of the possibilities of increasing the size of such members.

The latest constructions in the art of manufacturing rotors have taken the forms wherein the spider arms, in the case of fabricated construction, and more particularly, in the case of cast construction, have been integrally united with the heavy rims which are subjected to large centrifugal forces while being rotated. Large tensional strains are thereby imparted to the central hub connections of the radial arms, thus placing an undersirable limitation on the size of the rotor.

It is an object of my invention to provide a rotor with means for relieving the radial tension in the spider arms by reason of centrifugal forces exerted by the rim.

It is a further object of my invention to provide a rotor wherein better utilization of material may be made and which may be run at higher speeds than those which have been constructed heretofore.

In accordance with my invention, I provide the ends of the spider arms with resilient connections or flexible plates, to which the heavy rim is secured. In the process of assembling the rotor, the rim is expanded by heat, and wedge pins are disposed between the inner periphery of the rim and the flexible plates carried by spider arms, so that, upon shrinking of the rim, the arms are placed under compression. By virtue of the tendency for the rim to expand, when rotated, the arms are accordingly relieved of tension, at a predetermined speed of the rotor. Practically no stresses remain in the arms during such running conditions, and the rim approaches a floating condition with respect to the spider.

Figure 5:
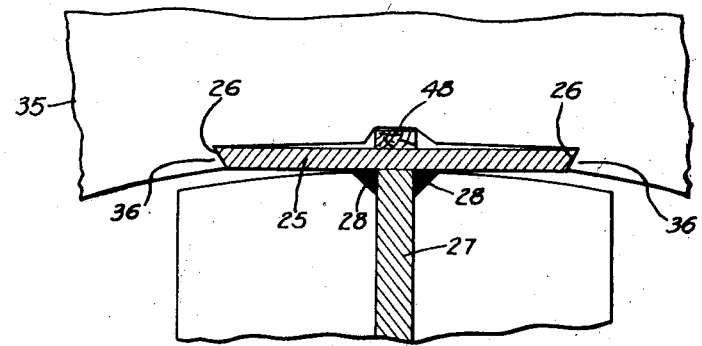
Figure 7:
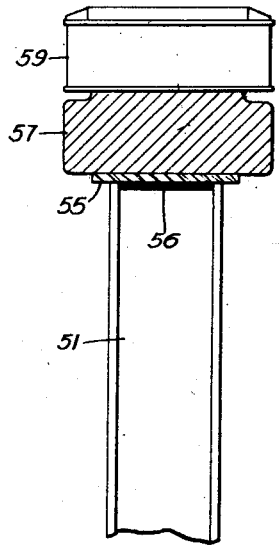
Figure 6:
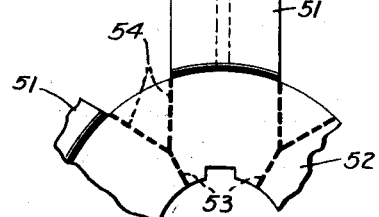

For a better understanding of my invention, reference may be had to the accompanying drawings, in which Figure 1 is a view, partially in elevation and partially in section, of a portion of a large fabricated rotor embodying my invention, Fig. 2 is a sectional view taken on a plane represented by the line II—II of Fig. 1, Fig. 3 is a developed top plan view of a portion of the rotor, the rim being removed, showing the arrangement of the parts embodied in my invention, Fig. 4 is a perspective view of a plate utilized in providing flexibility at the points where the rotor rim is attached to the spider, Fig. 5 is an enlarged sectional detail view showing a novel feature of my invention, Fig. 6 is a fragmentary view, in elevation, showing a modified form of my invention, and Fig. 7 is an elevational view, partially in section, of the rotor shown in Fig. 6, the section being on a plane represented by the line VII—VII thereof.

In the drawings, extra heavy lines have been used to indicate where the parts are welded, as well as, in some places, to show the contours of parts, while the dotted heavy lines are used to indicate the same places of welding that are invisible in the drawings.

In Figs. 1 to 5, inclusive, is illustrated a rotor, constructed in accordance with my invention, in which a hub 11 comprises two cylindrical parts 12 and 13 which are held in abutted or end-to-end relation by a cylindrical weld, indicated at 14. The hub 11 has flange portions 15 and 16, to which radial spider arms 17 having an H-section may be secured, as by means of bolts 18.

Adjacent spider arms are rigidly fixed to each other at the hub, by welding them to gusset plate 19, as indicated at 20. In order to support the arms at their outer ends, rings 21 are provided, to which the arms are fastened by the welds 22 and 23, and by bolts 24.

In assembling the spider portion of the rotor member, the spider arms 17 and rings 21 are welded together, with the gussets 19 at the inner ends, as described. Then the whole is turned to the proper outside diameter and bored to the proper inside diameter, after which the two hubs 12 and 13 are pressed into place, bolted at 18, as described, and preferably also welded at 24$^a$ by means of fillet welds along the inner edges of the webs of the H-beam spider-arms 17.

A slightly flexible plate 25 having beveled edges 26, is welded, along the middle thereof, to the web portion 27 of each of the H-beam spider-arms 17 at the end thereof, as indicated at 28, the construction of which is shown more clearly in Fig. 5. Perforations 29 are provided in the plate to make plug-weld connections to the peripheries of the rings 21 and to the flange portions of the H-beam spider-arms 17, as shown in Fig. 3.

In order to support the ends of the plate 25, and to provide a guard for protection during transportation, a plurality of projecting members 31, having a T-section, are welded to the ring 21, with the flange facing toward the center of the rotor, in the manner indicated at 32. A ring 33 is fillet-welded to the outer ends of the projecting T-bar pieces 31, and is also plug-welded to the plates 25, through recesses 34 at the ends of the latter.

A rim 35 of the laminated type, as shown in Fig. 1, is provided, having dove-tail tabs 36 with which the plates 25 have engagement. The rim 35 consists of punchings held together between end plates 37 by means of bolts 38, as shown in Fig. 2.

The flexible plates 25 are provided with recesses 39 to facilitate the assembly of the laminations, whereby the dove-tail tabs 36 of the laminations may be passed therethrough, thereby making it unnecessary to slide the lamination the entire length of the plate.

The laminated rim 35 supports salient pole pieces 42 which may be secured in position by dove-tail joints 43, as shown in Fig. 1.

In the particular embodiment of my invention shown in Fig. 1, I provide twice as many connecting plates 25, between the rim 35 and the spider member, as there are spider arms 17. To support the connecting plates 25 which are disposed mid-way between spider arms, I provide short H-section pieces 45 having the same cross-section as the spider arms, but not long enough to extend to the hub. These short cross-H-bars 45 are connected between the rings 21, and are attached to connecting plates 25, in the same manner as the spider arms 17, as described above.

In assembling the rotor, the rim 35 is heated to a high temperature, by any suitable means, such as a gas flame, or electric heaters, until it is expanded sufficiently to provide a space of about one-sixteenth of an inch between it and the center of each of the flexible connecting plates 25, and, at the same time, the spider arms 17 are kept cool by any available means, such as by a cold pack. When the desired expansion is obtained, a wedge pin 48 is inserted between the rim 35 and the central portion of each of the connecting plates, the thickness of the wedge pins being so calculated that, when the rim is cold and stationary, the spider-arms will be under compression with a force equal and opposite to the centrifugal force which will be developed at a certain speed, which may be the rated speed or a certain over-speed, according to the exigencies of the case.

It will be noted that the flexible connecting plates 25 are slightly flexed, by this process, and that they support the weight of the rim 35 and transmit torque between the rim and the spider, without pulling outwardly on the spider arms 17, due to the expansion of the rim, at high speeds.

In Figs. 6 and 7, is illustrated a more simple construction, showing an application of my invention to solid-rim rotors. Adjacent spokes or arms 51 of H-section material are welded to hub plates 52, and to each other at the hub, as indicated at 53 and 54, respectively. The outer ends of the arms are tapered and their web portions are connected to flexible plates 55, by fillet welds 56 between the webs of the spider-arms and the undersides of the plates.

A solid rim 57, having bolts 58 for carrying field pole pieces 59, is secured to the plates 55, at both ends thereof, by welds 61. Each plate is provided with perforations 62 so that it will not interfere with the heads of the bolts utilized to fix the pole pieces. Consequently, upon rotation of the rotor, any expansion of the rim is not transmitted to the arm because of the flexibility provided by the flexibly-mounted plates 55.

In illustrating my invention, reference has been made to fabricated construction, but it will be understood that it has equal application to a cast construction for either the rim or the spider.

Also, it will be understood that my invention may readily be adapted to flywheels, or to any other application having to do with the rotation of large rim-mass at high speeds, and is, therefore, not entirely limited to rotors of dynamo-electric machines.

It will be apparent, to those skilled in the art, that the foregoing, and various other modifications may be made in the detailed arrangement of parts, but it is intended to cover herein such modifications as fall within the spirit and scope of my invention, as defined in the appended claims.

I claim as my invention:

1. A rotatable apparatus comprising separate rim and spider members and circumferentially disposed plates secured, at circumferentially aligned spaced points, to the rim and spider members, respectively, said plates lying against the end surfaces of the spider members, whereby said plates support the weight of the rim member and transmit rotational torque thereto or therefrom, without materially pulling outwardly on the spider member when the rim member expands, under expected speed conditions, due to the centrifugal forces therein.

2. A rotatable apparatus comprising a spider member and a relatively massive rim member, the latter being of such nature as to tend to expand under centrifugal forces resulting from expected speed conditions, circumferentially disposed plates secured, at spaced points, to the rim and spider members, respectively, and a wedge member interposed between each plate, near its point of connection to one of said members, and the other of said members, said spider members being, when the apparatus is at standstill, under a compressional force which is approximately equal and opposite to the expected centrifugal forces, whereby said plates support the weight of the rim member and transmit rotational torque thereto or therefrom, without materially pulling outwardly on the spider member when the rim member expands, under expected speed conditions, due to the centrifugal forces therein.

3. A rotor for a dynamo-electric machine comprising a hub, spider arms secured to said hub, a laminated rim having circumferentially spaced, inwardly-projecting portions, slightly flexible plates secured to ends of said arms, each of which is in engagement with two of said portions of said rims at points in substantially circumferential alinement with the points of attachment between the plates and the arms, said plates lying against the end surfaces of said spider arms.

4. A rotor for a dynamo-electric machine comprising a hub, spider arms secured to said hub, a laminated rim having circumferentially spaced, inwardly-projecting dove-tail portions, flexible plates engaging said portions and welded to the outer ends of said arms, along the middle region of said plates, at points in substantially circumferential alinement with the dove-tail portions, said plates lying against the end surfaces of said spider arms.

5. A rotor for a dynamo-electric machine comprising a hub, spider arms secured to said hub, a laminated rim having inwardly-projecting portions, flexible plates recessly-engaging said portions, means for securing said arms to said plates, and separate means disposed between adjacent arms for resiliently supporting said rim.

6. A rotor for a dynamo-electric machine comprising a hub, spider arms secured to said hub, a laminated rim having inwardly-projecting portions, plates recessly-engaging said portions, means for securing said arms to said plates, additional means for holding said arms in spaced circumferential relation comprising annular members, and means carried by said annular members for resiliently engaging said rim, between adjacent arms, in a manner similar to the above-recited means for attaching each of said arms and including the utilization of above-mentioned plates.

7. In a rotor member for a dynamo-electric machine, a hub, spider arms of H-section structural steel welded to said hub, a laminated rim, the inner periphery of which has inwardly-projecting portions, means for attaching said rim to the ends of said arms comprising plates recessly engaging two of said portions and having elongated perforations along the middle thereof, the web portion of said H-section being welded to the middle of said plate, said plate being further welded at the flange portion of said H-section within the perforations and having notches in its edge to aid in the assembly of said laminations.

8. In a rotor member for a dynamo-electric machine, a hub, spider arms of H-section structural steel welded to said hub, a laminated rim, annular members for holding the ends of the arms in spaced circumferential relation, plates welded to the ends of said arms and projecting outwardly beyond said annular members, and a flange carried by said annular means for supporting and protecting the outer ends of said plate.

9. A rotor for a dynamo-electric machine comprising a hub, spider arms secured to said hub, a rim, slightly-flexible plates having their two circumferentially extending ends secured to the inner periphery of said rim, and said arms being fixed to said plates at points in substantially circumferential alinement with said ends of the plates.

10. A rotor for a dynamo-electric machine comprising a hub, spider arms secured to said hub, a rim, plates having their two circumferentially extending ends secured to the inner periphery of said rim, and the outer ends of said arms being welded to the respective plates at a region intermediate said ends and in substantially circumferential alinement with said ends of the plates.

11. A fabricated wheel comprising a hub, spider arms of structural steel of H-section, secured to said hub, a rim, resilient plates having their ends secured to the inner periphery of said rim, and the web portion of said H-section secured to said plates at a region midway between the ends thereof.

12. A rotor member comprising a hub, spider-arms and a rim, characterized by the fact that torque-transmitting plates are interposed between, and connected to, the inner periphery of the rim and to the outer ends of the respective spider-arms in a manner adapted to transmit tangential driving torques, the points of connection to the rim and spider-arms, respectively being substantially circumferentially aligned.

13. A rotor member comprising a hub, spider-arms and a rim, characterized by the fact that torque-transmitting plates are interposed between, and connected to, the inner periphery of the rim and to the outer ends of the respective spider-arms in a manner adapted to transmit tangential driving torques, the points of connection to the rim and spider-arms, respectively, being substantially circumferentially aligned, and characterized further by the fact that the rim is shrunk onto the spider-arms with sufficient tightness to prevent expansion out of contact therewith by reason of centrifugal forces at a predetermined speed which is at least as high as the normal rated operating speed of the rotor member.

14. A rotor member comprising a hub, a plurality of spider-arms extending outwardly from said hub, an annular member joining the spider-arms near their outer ends, to constitute a spider structure, and a relatively heavy rim surrounding said spider structure, characterized by the fact that torque-transmitting plates are interposed between, and connected to, portions of the inner periphery of the rim and portions of the outer periphery of the spider structure in a manner adapted to transmit tangential driving torques, the points of connection to the rim and spider structure, respectively, being substantially circumferentially aligned.

15. A rotor member comprising a hub, a plurality of spider-arms extending outwardly from said hub, an annular member joining the spider-arms near their outer ends, to constitute a spider structure, and a relatively heavy rim surrounding said spider structure, characterized by the fact that torque-transmitting plates are interposed between, and connected to, portions of the inner periphery of the rim and portions of the outer periphery of the spider structure in a manner adapted to transmit tangential driving torques, the points of connection to the rim and spider structure, respectively, being substantially circumferentially aligned, and characterized further by the fact that the rim is shrunk onto the spider structure with sufficient tightness to prevent expansion out of contact therewith by reason of centrifugal forces at a predetermined speed which is at least as high as the normal rated operating speed of the rotor member.

16. A rotor member comprising a hub, a plurality of radial spider-arms extending outwardly from said hub, annular members joining the spider-arms near their outer ends, short intermediate radial pieces secured to said annular members between said spider-arms, a relatively heavy rim, and torque-transmitting plates interposed between, and connected to, the inner periphery of the rim and to the outer ends of the respective radial arms and intermediate radial pieces in a manner adapted to transmit tangential driving torques, the points of connection to the rim and radial arms and/or pieces, respectively, being displaced circumferentially.

17. A rotor member comprising a hub, a plurality of radial spider-arms extending outwardly from said hub, annular members joining the spider-arms near their outer ends, short intermediate radial pieces secured to said annular members between said spider-arms, a relatively heavy rim, and torque-transmitting connections from the radial spider-arms and from the intermediate radial pieces to the inner periphery of the rim, the said rim being shrunk onto the spider-arms and intermediate radial pieces with sufficient tightness to prevent expansion out of contact therewith by reason of centrifugal forces at a predetermined speed which is at least as high as the normal rated operating speed of the rotor member.

In testimony whereof I have hereunto subscribed my name this 4th day of January, 1929.

RENÉ A. BAUDRY.